US012806827B2

(12) United States Patent

Aota et al.

(10) Patent No.: US 12,806,827 B2

(45) Date of Patent: Nov. 24, 2026

(54) MOLDING MATERIAL, MOLDED BODY, AND MOLDED BODY PRODUCTION METHOD

(71) Applicant: SEIKO EPSON CORPORATION, Tokyo (JP)

(72) Inventors: Masaaki Aota, Suwa (JP); Tomohiro Fujita, Matsumoto (JP); Takashi Hiraiwa, Fujimi (JP)

(73) Assignee: SEIKO EPSON CORPORATION (JP)

( * ) Notice: Subject to any disclaimer, the term of this patent is extended or adjusted under 35 U.S.C. 154(b) by 57 days.

(21) Appl. No.: 18/819,071

(22) Filed: Aug. 29, 2024

(65) Prior Publication Data

US 2025/0073964 A1 Mar. 6, 2025

(30) Foreign Application Priority Data

Aug. 30, 2023 (JP) ................................ 2023-140431

(51) Int. Cl.

*B29C 45/72* (2006.01)
*B29C 45/00* (2006.01)
*B29K 75/00* (2006.01)
*B29K 105/12* (2006.01)
*B29K 201/00* (2006.01)

(52) U.S. Cl.

CPC ...... *B29C 45/0001* (2013.01); *B29C 45/0005* (2013.01); *B29C 45/72* (2013.01); *B29K 2075/00* (2013.01); *B29K 2105/122* (2013.01); *B29K 2201/00* (2013.01)

(58) Field of Classification Search

CPC combination set(s) only.
See application file for complete search history.

(56) References Cited

U.S. PATENT DOCUMENTS

2021/0301106 A1* 9/2021 Yokokawa ................ C08L 1/02
2021/0301107 A1* 9/2021 Tanaka ................... B27N 3/002

FOREIGN PATENT DOCUMENTS

CN 113072768 A * 7/2021 .............. C08L 23/12
JP 2004-025857 A 1/2004

OTHER PUBLICATIONS

Softwood and Hardwood fiber dimensions (Year: 2026).*
Melting point of polypropylene (Year: 2025).*

* cited by examiner

*Primary Examiner* — Peter A Salamon

(74) *Attorney, Agent, or Firm* — Harness, Dickey & Pierce, P.L.C.

(57) ABSTRACT

A molding material of the present disclosure includes cellulose fibers, a resin melting at 200° C. or lower, and polyurethane, the molding material having complex viscosity at 180° C. of 3000 Pa·s or more and 147000 Pa·s or less. The resin is preferably at least one selected from the group consisting of polypropylene and polylactic acid.

9 Claims, 1 Drawing Sheet

TABLE 1

| | | EXAMPLE | | | | | | COMPARATIVE EXAMPLE | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| CONSTITUENT | POLYPROPYLENE | 90.0 | 70.0 | 50.0 | 30.0 | 20.0 | – | 100.0 | 10.0 | – | – | – | – | – |
| | POLYLACTIC ACID | – | – | – | – | – | 86.0 | – | – | 100.0 | 97.0 | 93.0 | 83.7 | 94.0 |
| | CELLULOSE FIBER | 3.8 | 11.4 | 19.0 | 26.6 | 30.4 | 7.0 | – | 34.2 | – | – | – | – | 3.0 |
| | ACRYLIC FIBER | 3.1 | 9.3 | 15.5 | 21.7 | 24.8 | – | – | 27.9 | – | – | – | – | – |
| | POLYESTER FIBER | 2.4 | 7.2 | 12.0 | 16.8 | 19.2 | – | – | 21.6 | – | – | – | – | – |
| | POLYURETHANE | 0.7 | 2.1 | 3.5 | 4.9 | 5.6 | 7.0 | – | 6.3 | – | 3.0 | 7.0 | 16.3 | 3.0 |
| COMPLEX VISCOSITY [Pa·s] | | 3042 | 9211 | 27894 | 84472 | 146997 | 3538 | 1744 | 204960 | 1478 | 1726 | 1912 | 2119 | 2720 |
| EVALUATION | MOLDABILITY | A | A | A | A | A | A | C | D | C | C | C | C | C |
| | CHARPY IMPACT STRENGTH [kJ/m²] | 2.46 | 3.97 | 3.46 | 3.41 | 3.19 | – | 2.48 | – | – | – | – | – | – |
| | BENDING STRENGTH [MPa] | 42.19 | 39.35 | 38.64 | 35.08 | 34.50 | – | 37.47 | – | – | – | – | – | – |
| | BENDING ELASTIC MODULUS [GPa] | 1.47 | 1.84 | 1.95 | 2.14 | 2.20 | – | 1.20 | – | – | – | – | – | – |

TABLE 1

| | | EXAMPLE | | | | | | COMPARATIVE EXAMPLE | | | | | | |
|---|---|---|---|---|---|---|---|---|---|---|---|---|---|---|
| | | 1 | 2 | 3 | 4 | 5 | 6 | 1 | 2 | 3 | 4 | 5 | 6 | 7 |
| CONSTITUENT | POLYPROPYLENE | 90.0 | 70.0 | 50.0 | 30.0 | 20.0 | – | 100.0 | 10.0 | – | – | – | – | – |
| | POLYLACTIC ACID | – | – | – | – | – | 86.0 | – | – | 100.0 | 97.0 | 93.0 | 83.7 | 94.0 |
| | CELLULOSE FIBER | 3.8 | 11.4 | 19.0 | 26.6 | 30.4 | 7.0 | – | 34.2 | – | – | – | – | 3.0 |
| | ACRYLIC FIBER | 3.1 | 9.3 | 15.5 | 21.7 | 24.8 | – | – | 27.9 | – | – | – | – | – |
| | POLYESTER FIBER | 2.4 | 7.2 | 12.0 | 16.8 | 19.2 | – | – | 21.6 | – | – | – | – | – |
| | POLYURETHANE | 0.7 | 2.1 | 3.5 | 4.9 | 5.6 | 7.0 | – | 6.3 | – | 3.0 | 7.0 | 16.3 | 3.0 |
| COMPLEX VISCOSITY [Pa·s] | | 3042 | 9211 | 27894 | 84472 | 146997 | 3538 | 1744 | 204960 | 1478 | 1726 | 1912 | 2119 | 2720 |
| EVALUATION | MOLDABILITY | A | A | A | A | A | A | C | D | C | C | C | C | C |
| | CHARPY IMPACT STRENGTH [kJ/m$^2$] | 2.46 | 3.97 | 3.46 | 3.41 | 3.19 | – | 2.48 | – | – | – | – | – | – |
| | BENDING STRENGTH [MPa] | 42.19 | 39.35 | 38.64 | 35.08 | 34.50 | – | 37.47 | – | – | – | – | – | – |
| | BENDING ELASTIC MODULUS [GPa] | 1.47 | 1.84 | 1.95 | 2.14 | 2.20 | – | 1.20 | – | – | – | – | – | – |

MOLDING MATERIAL, MOLDED BODY, AND MOLDED BODY PRODUCTION METHOD

The present application is based on, and claims priority from JP Application Serial Number 2023-140431, filed Aug. 30, 2023, the disclosure of which is hereby incorporated by reference herein in its entirety.

BACKGROUND

1. Technical Field

The present disclosure relates to a molding material, a molded body, and a molded body production method.

2. Related Art

In recent years, there has been social movements towards effective use of resources, reduction of waste, and conservation through recycling of various plastic materials such as polyester.

JP-A-2004-025857 discloses a wood substitute material for packaging, the wood substitute material having a density of 0.4 to 0.7 g/cm$^3$ and being obtained by subjecting a fiber mass in which 100 parts by mass of recovered fibers and 30 to 50 parts by mass of thermoplastic resin fibers having a melting point lower than the temperature at which the recovered fibers deteriorate are entangled with each other to thermocompression at a temperature higher than the melting point of the thermoplastic resin fibers and at which the recovered fibers are not caused to deteriorate.

Polyurethane has characteristics such as excellent stretchability and excellent flexibility, and is used in various products such as clothing.

However, polyurethane is difficult to recycle because toxic gas (an amine group-containing compound and the like) and odor are generated through thermal decomposition. In addition, although JP-A-2004-025857 discloses compression molding, a molded body having sufficiently high mechanical strength cannot be obtained when recovered fibers including polyurethane are used. Furthermore, in the technique described in JP-A-2004-025857, when recovered fibers including polyurethane are used, injection molding is not possible, and the degree of freedom of molding is low.

SUMMARY

The present disclosure has been made to solve the above problem and is embodied as the following application examples.

A molding material according to an application example of the present disclosure includes cellulose fibers, a resin melting at 200° C. or lower, and polyurethane, the molding material having complex viscosity at 180° C. of 3000 Pa·s or more and 147000 Pa·s or less.

A molded body according to an application example of the present disclosure is formed from the molding material according to the application example of the present disclosure.

A molded body production method according to an application example of the present disclosure molds the molding material according to the application example of the present disclosure while heating the molding material according to the application example of the present disclosure to a temperature at which the resin melts.

BRIEF DESCRIPTION OF THE DRAWING

FIGURE is a table collectively showing molding material compositions, complex viscosity at 180° C. of the molding materials, and evaluation results for Examples and Comparative Examples.

DESCRIPTION OF EMBODIMENTS

Hereinafter, preferable embodiments of the present disclosure will be described in detail.

1 Molding Material

First, a molding material of the present disclosure will be described. The molding material of the present disclosure includes cellulose fibers, a resin melting at 200° C. or lower, and polyurethane, the molding material having complex viscosity at 180° C. of 3000 Pa·s or more and 147000 Pa·s or less.

According to such a configuration, a molding material that includes polyurethane, is capable of being injection molded, and has a high degree of freedom of molding can be provided. In addition, a molding material that can be suitably used for producing a molded body excellent in mechanical strength, in particular, excellent in both impact strength and bending strength can be provided. Furthermore, since it is possible to make moldability of a molded body more excellent, productivity of a molded body can also be improved. In particular, when the resin melting at 200° C. or lower is included, the molding material can be suitably molded at a temperature at which thermal decomposition of polyurethane is sufficiently prevented.

Although polyurethane is contained in used clothing and the like in a large amount, since toxic gas is generated through thermal decomposition, recycling thereof has been difficult and incineration disposal has also been difficult in the past. However, according to the present disclosure, such polyurethane can be suitably reused.

In addition, by virtue of including cellulose fibers, which are abundant natural material derived from plants, environmental problems, saving of underground resources, and the like can be suitably dealt with, and inclusion of cellulose fibers is advantageous also from the viewpoints of stable supply of the molding material and a molded body produced by using same, reduction in costs, and the like. Cellulose fibers are also a component contained in, for example, used paper, used fabric, and the like besides virgin pulp in a large amount and are advantageous also from the viewpoint of facilitating effective reusing of resources.

On the other hand, when the above-described conditions are not satisfied, desirable results are not obtained. For example, even in the case of a molding material including a resin melting at 200° C. or lower and polyurethane, when the molding material does not include cellulose fibers, the elastic modulus and shape retainability of a molded body produced by using the molding material are remarkably poor.

Furthermore, even in the case of a molding material including cellulose fibers and a resin melting at 200° C. or lower, when the molding material does not include polyurethane, a problem of decreasing impact strength arises.

Furthermore, even in the case of a molding material including cellulose fibers and polyurethane, when the molding material includes no resin melting at 200° C. or lower, moldability of a molded body therefrom remarkably deteriorates, that is, for example, injection molding is impossible. In addition, mechanical strength of a molded body produced is also poor due to the deterioration of moldability.

Furthermore, when a resin with a melting point higher than 200° C. is used for the molding material instead of the resin melting at 200° C. or lower, the degree of freedom of molding cannot be sufficiently increased, making injection molding impossible, for example. In addition, a molded body produced by using such a molding material has poor mechanical strength.

When the complex viscosity of the molding material at 180° C. is less than the above-described lower limit, problems such as measuring failure during injection molding, burrs of a molded body, and generation of bubbles in a molded body arise.

Meanwhile, when the complex viscosity of the molding material at 180° C. exceeds the above-described upper limit, problems such as short shots in a molded body and increase in the likelihood of damage to an injection molding machine and to a mold arise.

Note that, in the present disclosure, the complex viscosity refers to dynamic viscoelasticity measured in rheometer measurement. The complex viscosity can be obtained by measurement in which a sample with a thickness of 1 mm is interposed in a gap between parallel plates and sandwiched therebetween, and the lower flat plate is angularly vibrated in this state, the measurement conducted under the following conditions: initial temperature: 100° C., temperature increment: 1° C., final temperature: 200° C., temperature increase rate: 5° C./min, strain control: 0.1 deg, frequency: 1 Hz, automatic control: ON, waveform: sine wave, continuous vibration: ON, average number of times: 3, and load control: OFF. The complex viscosity can be obtained, for example, by measurement using Pheosol-G3000 (manufactured by UBM).

As described above, the complex viscosity at 180° C. of the molding material of the present disclosure may be 3000 Pa·s or more and 147000 Pa·s or less, but is preferably 4000 Pa·s or more and 140000 Pa·s or less, more preferably 5000 Pa·s or more and 90000 Pa·s or less, and still more preferably 7000 Pa·s or more and 40000 Pa·s or less. Consequently, the above-described effects are more remarkably exhibited.

1-1 Cellulose Fibers

The molding material of the present disclosure includes cellulose fibers.

The cellulose fiber component greatly contributes to retainment of the shape of a molded body produced by using the molding material of the present disclosure and greatly affects properties such as strength of the molded body.

Cellulose is an abundant natural material derived from plants. Therefore, when cellulose fibers are used, environmental problems, conservation of underground resources, and the like can be suitably dealt with, and use of cellulose is preferable also from the viewpoints of stable supply of the molding material and a molded body produced by using the molding material, cost reduction, and the like. In addition, cellulose fibers theoretically have especially high strength among various types of fibers, and cellulose fibers are thus advantageous also from the viewpoint of improving strength of a molded body.

Virgin pulp may be used as the cellulose fibers, and wastepaper, used cloth, and the like may be reused.

The cellulose fibers are usually composed mainly of cellulose but may include a component other than cellulose. Examples of such a component include hemicellulose and lignin.

Cellulose fibers having been subjected to treatment such as bleaching may be used as the cellulose fibers. Examples of the cellulose fibers include cotton, linen, rayon, and cupra.

The average length of the cellulose fibers is not particularly limited but is preferably 50 μm or more and less than 3 mm, more preferably 70 μm or more and less than 500 μm, and still more preferably 100 μm or more and less than 400 μm.

Shape stability, strength, and the like of a molded body produced by using the molding material can be made more excellent thereby. In addition, dust generation in a molded body produced by using the molding material can be more effectively prevented and suppressed. In addition, generation of unwilling irregularities on a surface of a molded body produced by using the molding material can be more effectively prevented. Incidentally, the fiber length is obtained by a method in accordance with ISO 16065-2:2007.

The average diameter of the cellulose fibers is not particularly limited but is preferably 3 μm or more and less than 100 μm, more preferably 4 μm or more and less than 50 μm, and still more preferably 5 μm or more and less than 20 μm.

Shape stability, strength, and the like of a molded body produced by using the molding material can be made more excellent thereby. In addition, generation of unwilling irregularities on a surface of a molded body produced by using the molding material can be more effectively prevented.

The average aspect ratio, that is, the ratio of the average length to the average diameter of the cellulose fibers is not particularly limited but is preferably 10 or more and 1000 or less, and more preferably 15 or more and 100 or less.

Shape stability, strength, and the like of a molded body produced by using the molding material can be made more excellent thereby. In addition, dust generation in a molded body produced by using the molding material can be more effectively prevented and suppressed. In addition, generation of unwilling irregularities on a surface of a molded body produced by using the molding material can be more effectively prevented.

The content of the cellulose fibers in the molding material of the present disclosure is preferably 2.0% by mass or more and 40.0% by mass or less, more preferably 3.0% by mass or more and 35.0% by mass or less, and still more preferably 5.0% by mass or more and 30.0% by mass or less.

Consequently, the complex viscosity at 180° C. of the molding material is easily adjusted to fall within a more preferable range, and the above-described effects provided by the present disclosure are more remarkably exhibited.

1-2 Resin Melting at 200° C. or Lower

The molding material of the present disclosure includes a resin melting at 200° C. or lower, that is, includes a resin with a melting point of 200° C. or lower. However, polyurethane is not included in the resin.

When the resin is included, toughness of a molded body produced by using the molding material of the present disclosure can be enhanced, and impact resistance of the molded body can be made sufficiently excellent.

The melting point of the resin may be 200° C. or lower but is preferably 115° C. or higher and 185° C. or lower and more preferably 145° C. or higher and 180° C. or lower.

The resin may be a resin that melts solely at 200° C. or lower, but is preferably a resin that is compatible with polyurethane at 200° C. or lower.

Consequently, the degree of freedom of molding becomes higher, and the mechanical strength of a molded body produced becomes more excellent.

Examples of the resin include polyolefins such as polyethylene and polypropylene and polyesters such as an aliphatic polyester and an aromatic polyester. One kind or a combination of two or more kinds selected therefrom can be used, and at least one kind selected from the group consisting of polypropylene and polylactic acid is preferable.

Consequently, compatibility between the resin and polyurethane can be made more excellent, and the above-described effects are more remarkably exhibited.

In particular, consumption of underground resources can be more suitably reduced by using polylactic acid derived from a biomass raw material.

In addition, in the present disclosure, even when recycled polypropylene is used, the above-described excellent effects are obtained. More specifically, a problem with recycled polypropylene is that recycled polypropylene thermally decomposes during recycling process to have a lower molecular weight, resulting in decreased viscosity and poor moldability, in general; however, in the present disclosure, excellent injection moldability can be ensured even when recycled polypropylene is used.

The aliphatic polyester is a polyester having no aromatic chemical structure and is a polyester in which all constituent monomers have no aromatic chemical structure. Examples of the aliphatic polyester include a polyester in which both the polycarboxylic acid component and the polyhydric alcohol component as constituent monomers have an aliphatic alkylene group. The aliphatic polyester may also be a polyester formed from a monomer having a hydroxy group and a carboxy group within a molecule. Examples of the aliphatic polyester formed from a monomer having a hydroxy group and a carboxy group within a molecule include polylactic acid.

When the aliphatic polyester has a chemical structure formed through polymerization of a polycarboxylic acid component having an aliphatic alkylene group and a polyhydric alcohol component having an aliphatic alkylene group, the aliphatic polyester is preferably a polyester having a chemical structure formed through condensation of an alkylenedicarboxylic acid having an alkylene group with a carbon chain length of 2 or more and 6 or less and an alkylenediol having an alkylene group with a carbon chain length of 2 or more and 8 or less.

Consequently, the above-described effects are more remarkably exhibited, and compatibility with polyurethane can be made more excellent, more remarkably exhibiting the above-described effects.

The carbon chain length of the alkylene group of the alkylenedicarboxylic acid is preferably 2 or more and 6 or less, more preferably 2 or more and 5 or less, and still more preferably 2 or more and 4 or less. Consequently, the above-described effects are more remarkably exhibited.

The alkylene group of the alkylenedicarboxylic acid may have a branched structure but is preferably linear. Consequently, the above-described effects are more remarkably exhibited.

Examples of the alkylenedicarboxylic acid include succinic acid, glutaric acid, adipic acid, pimelic acid, suberic acid, azelaic acid, and sebacic acid, and one kind or a combination of two or more kinds selected therefrom can be used.

The carbon chain length of the alkylene group of the alkylenediol is preferably 2 or more and 8 or less, more preferably 2 or more and 6 or less, and still more preferably 3 or more and 5 or less. Consequently, the above-described effects are more remarkably exhibited.

The alkylene group of the alkylenediol may have a branched structure but is preferably linear. Consequently, the above-described effects are more remarkably exhibited.

Examples of the alkylene alkylenediol include 1,2-ethanediol, 1,3-propanediol, 1,4-butanediol, 1,5-pentanediol, 1,6-hexanediol, 1,7-heptanediol, and 1,8-octanediol, and one kind or a combination of two or more kinds selected therefrom can be used.

Specific examples of the aliphatic polyester including an alkylenedicarboxylic acid and an alkylenediol satisfying the above requirements as monomer components include polybutylene succinate, polybutylene succinate adipate, and polyethylene adipate, and one kind or a combination of two or more kinds selected therefrom can be used.

These materials are biodegradable and can more suitably reduce the environmental burden of molded bodies. In addition, these materials are relatively inexpensive and easily available in a stable manner. Accordingly, these materials are advantageous also from the viewpoints of stable supply of the molding material and a molded body thereof, cost reduction, and the like.

The content of the resin in the molding material of the present disclosure is not particularly limited but is preferably 15.0% by mass or more and 90.0% by mass or less, more preferably 25.0% by mass or more and 85.0% by mass or less, and still more preferably 45.0% by mass or more and 80.0% by mass or less.

Consequently, the complex viscosity at 180° C. of the molding material is easily adjusted to fall within a more preferable range, and the above-described effects provided by the present disclosure are more remarkably exhibited.

When the content of the cellulose fibers and the content of the resin in the molding material of the present disclosure are denoted as XC [mass %] and XR [mass %], respectively, the relation therebetween satisfies preferably $0.03 \leq XC/XR \leq 0.60$, more preferably $0.04 \leq XC/XR \leq 0.50$, and still more preferably $0.07 \leq XC/XR \leq 0.45$.

Consequently, the complex viscosity at 180° C. of the molding material is easily adjusted to fall within a more suitable range, and the above-described effects provided by the present disclosure are more remarkably exhibited.

1-3 Polyurethane

The molding material of the present disclosure includes polyurethane.

Polyurethane is a component usually having excellent affinity with both the cellulose fibers and the resin.

The polyurethane is usually made compatible with the resin during the process of producing a molded body using the molding material of the present disclosure, especially during heat treatment in molding.

Consequently, bending strength of a molded body produced by using the molding material of the present disclosure can be improved.

The number average molecular weight of the polyurethane is preferably 20000 or more and 300000 or less, more preferably 30000 or more and 200000 or less, and still more preferably 40000 or more and 150000 or less.

Consequently, affinity of the polyurethane with the cellulose fibers and the resin can be made more excellent, and impact strength and bending strength of a molded body produced by using the molding material can be made more excellent.

The polyurethane may be included in the molding material in any form such as a powdery form, for example, but may be included in a fibrous form. Polyurethane from used clothing, for example, can be suitably used thereby.

The content of the polyurethane in the molding material of the present disclosure is preferably 0.3% by mass or more and 6.0% by mass or less, more preferably 0.5% by mass or more and 5.0% by mass or less, and still more preferably 1.0% by mass or more and 3.2% by mass or less.

Consequently, the complex viscosity at 180° C. of the molding material is easily adjusted to fall within a more suitable range, and the above-described effects provided by the present disclosure are more remarkably exhibited. The sum of the content of the resin and the content of the polyurethane in the molding material of the present disclosure is preferably 25.0% by mass or more and 91.0% by mass or less, more preferably 30.0% by mass or more and 88.0% by mass or less, and still more preferably 45.0% by mass or more and 80.0% by mass or less.

Consequently, the complex viscosity at 180° C. of the molding material is easily adjusted to fall within a more suitable range, and the above-described effects provided by the present disclosure are more remarkably exhibited.

When the content of the resin and the content of the polyurethane in the molding material of the present disclosure are denoted as XR [mass %] and XU [mass %], respectively, the relation therebetween satisfies preferably $0.01 \leq XU/XR \leq 0.30$, more preferably $0.02 \leq XU/XR \leq 0.20$, and still more preferably $0.03 \leq XU/XR \leq 0.10$.

Consequently, the complex viscosity at 180° C. of the molding material is easily adjusted to fall within a more suitable range, and the above-described effects provided by the present disclosure are more remarkably exhibited. In particular, impact strength and bending strength of a molded body produced by using the molding material can be made more excellent.

When the content of the cellulose fibers and the content of the polyurethane in the molding material of the present disclosure are denoted as XC [mass %] and XU [mass %], respectively, the relation therebetween satisfies preferably $0.01 \leq XU/XC \leq 3.0$, more preferably $0.02 \leq XU/XC \leq 1.6$, and still more preferably $0.03 \leq XU/XC \leq 0.6$.

Consequently, the complex viscosity at 180° C. of the molding material is easily adjusted to fall within a more suitable range, and the above-described effects provided by the present disclosure are more remarkably exhibited. In particular, impact strength and bending strength of a molded body produced by using the molding material can be made more excellent.

1-4 Other Fibers

The molding material of the present disclosure may further include fibers other than those described above, in addition to the cellulose fibers, the resin, and the polyurethane described above. Hereinafter, such fibers are also referred to as the "other fibers." When the other fibers are included, strength a molded body is further enhanced, for example.

Examples of the other fibers include fibers formed from a resin material, and more specifically include polyester fibers, acrylic fibers, nylon fibers, and acetate fibers. Provided that the other fibers are formed from a material not melting at 200° C. and are in a fibrous state when the molding material is heated to 200° C.

The average length of the other fibers is not particularly limited but is preferably less than 3 mm, more preferably 50 μm or more and less than 500 μm, and still more preferably 100 μm or more and less than 400 μm.

Consequently, impact strength and bending strength of a molded body produced by using the molding material can be made more excellent.

The average diameter of the other fibers is not particularly limited but is preferably less than 100 μm, more preferably 3 μm or more and less than 50 μm, and still more preferably 5 μm or more and less than 20 μm.

Consequently, impact strength and bending strength of a molded body produced by using the molding material can be made more excellent.

The average aspect ratio, that is, the ratio of the average length to the average diameter of the other fibers is not particularly limited but is preferably 10 or more and 1000 or less, and more preferably 15 or more and 100 or less.

Consequently, impact strength and bending strength of a molded body produced by using the molding material can be made more excellent.

The content of the other fibers in the molding material of the present disclosure is preferably 1.0% by mass or more and 30.0% by mass or less, more preferably 2.0% by mass or more and 25.0% by mass or less, and still more preferably 3.0% by mass or more and 20.0% by mass or less.

Consequently, impact strength and bending strength of a molded body produced by using the molding material can be made more excellent.

When the content of the resin and the content of the other fibers in the molding material of the present disclosure are denoted as XR [mass %] and XO [mass %], respectively, the relation therebetween satisfies preferably $0.03 \leq XO/XR \leq 3.0$, more preferably $0.05 \leq XO/XR \leq 2.0$, and still more preferably $0.10 \leq XO/XR \leq 0.80$.

Consequently, impact strength and bending strength of a molded body produced by using the molding material can be made more excellent.

When the content of the cellulose fibers and the content of the other fibers in the molding material of the present disclosure are denoted as XC [mass %] and XO [mass %], respectively, the relation therebetween satisfies preferably $0.1 \leq XO/XC \leq 3.8$, more preferably $0.2 \leq XO/XC \leq 2.1$, and still more preferably $0.3 \leq XO/XC \leq 1.7$.

Consequently, impact strength and bending strength of a molded body produced by using the molding material can be made more excellent.

1-5 Flame Retardant

The molding material of the present disclosure may further include a flame retardant.

Examples of the flame retardant include an inorganic flame retardant such as an antimony compound, a metal hydroxide, a nitrogen compound, and a boron compound; and an organic flame retardant such as a bromine compound and a phosphorus compound.

In the case where the molding material includes the flame retardant, the content of the flame retardant can be 1.0 parts by mass or more and 20.0 parts by mass or less when the content of cellulose fibers, the resin, and the polyurethane in total is taken as 100.0 parts by mass.

Consequently, flame retardancy of a molded body produced by using the molding material of the present disclosure can be made more excellent, while more remarkably exhibiting the above-described effects provided by the present disclosure.

1-6 Other Components

The molding material of the present disclosure may include components other than those described above. Hereinafter, such components are also referred to as the "other components" in this section.

Examples of the other components include a colorant, an insect repellent, a fungicide, an antioxidant, an ultraviolet absorber, an aggregation inhibitor, a mold release agent, and a resin material other than those described above.

The content of the other components in the molding material of the present disclosure is preferably 10.0% by mass or less, more preferably 5.0% by mass or less, and still more preferably 3.0% by mass or less.

2 Molding Material Production Method

Next, a molding material production method of the present disclosure will be described.

The molding material of the present disclosure can be produced by mixing the above-described components, for example. In this case, timings for mixing the respective components may be identical or different from one another.

The molding material of the present disclosure may be produced by kneading the above-described components, for example. A monoaxial kneader or a biaxial kneader can be used for kneading each component, for example.

The material temperature during kneading is preferably lower than 200° C., more preferably 120° C. or higher and 190° C. or lower, and still more preferably 150° C. or higher and 180° C. or lower.

The molding material having a strand shape obtained through kneading may be subjected to pelletizing using a strand pelletizer, a watering hot cut pelletizer, or the like to be made into a pellet molding material, for example. The following method may also be applied as the molding material production method. That is, a kneaded mixture of the above-described components may be molded into a sheet shape and subsequently cut into a desired shape using, for example, a shredder to form a pellet molding material. Although the method for molding the kneaded mixture into a sheet shape is not particularly limited, examples thereof include a method in which the kneaded mixture is firstly deposited in air to obtain sheet-shaped deposits, and the deposits are compressed by a calender device to eliminate air and increase density, followed by heating in a non-contact manner using a heating furnace and subsequent heat-pressing with a heat-pressing device. Although the shape and the size of the pellet obtained by cutting are not particularly limited, the pellet may have an approximately cuboid shape with a side length of 2 mm or more and 5 mm or less, for example.

The cellulose fibers used to produce the molding material of the present disclosure may be preliminarily subjected to defibrination processing. In particular, a material obtained by defibrinating a cellulose fiber source including cellulose fibers such as used paper and used fabric may be used.

When the molding material of the present disclosure includes fibrous polyurethane, that is, urethane fibers, the urethane fibers used to produce the molding material may be preliminarily subjected to defibrination processing. In particular, a material obtained by defibrinating a urethane fiber source including urethane fibers such as used fabric may be used.

When the molding material of the present disclosure includes the other fibers, the other fibers used to produce the molding material of the present disclosure may be preliminarily subjected to defibrination processing. In particular, a material obtained by defibrinating a source of the other fibers including the other fibers such as used fabric may be used.

The fiber sources described above, that is, the cellulose fiber source, the urethane fiber source, the source of the other fibers may be coarsely pulverized before defibrination.

The fiber sources can be coarsely pulverized by shredding the fiber sources into strips in an atmosphere such as atmospheric air using a shredder having a coarsely pulverizing blade, for example. The shape of the strips is, for example, an approximately cube shape or approximately cuboid shape with a side length of several millimeters. The strips of the fiber sources are defibrinated to obtain defibrinated fibers. The term defibrination herein refers to loosening of fibers into a single fiber from a state where multiple fibers are integrated.

Defibrination can be suitably carried out under a dry-manner condition. The dry-manner herein is a manner in which defibrination is carried out in a gas such as atmospheric air not in a liquid. Water or the like may be sprayed into fibers for the purpose of prevention of static charge or the like, for example. Defibrination in a dry manner can be suitably carried out by an air flow, for example.

Defibrination of the fiber sources may be independently carried out for each of the fiber sources or may be carried out in a state where multiple kinds of the fiber sources are mixed.

A fiber source including multiple kinds of fibers, more specifically, two or more kinds of the cellulose fibers, the urethane fibers, and the other fibers may be used. Examples of the fiber source including two or more kinds of fibers include blended fabric.

Defibrination of the fiber sources may be carried out in a state of including a component other than fibers, for example, the resin, non-fibrous polyurethane, a flame retardant, another component, and the like.

3 Molded Body

Next, a molded body of the present disclosure will be described.

The molded body of the present disclosure is formed from the molding material of the present disclosure described above. Such a configuration can provide a molded body which includes polyurethane and is excellent in both impact strength and bending strength.

In addition, by virtue of including cellulose fibers, which are abundant natural material derived from plants, environmental problems, saving of underground resources, and the like can be suitably dealt with, and inclusion of cellulose fibers is advantageous also from the viewpoints of stable supply of the molded body, reduction in costs, and the like. Cellulose fibers are also a component contained in, for example, used paper, used fabric, and the like besides virgin pulp in a large amount and are advantageous also from the viewpoint of facilitating effective reusing of resources.

In addition, although polyurethane is contained in used clothing and the like in a large amount, polyurethane is difficult to isolate from other components when polyurethane is mixed with the other components as in blended fabric, for example. In addition, polyurethane generates toxic gas during heating treatment at 200° C. or higher. Therefore, reusing and incineration disposal of polyurethane have been difficult in the past. However, according to the present disclosure, polyurethane included in used clothing and the like can be suitably reused.

Incidentally, the molded body of the present disclosure may have a portion formed from a material other than the molding material of the present disclosure as long as the molded body has a portion formed from the molding material of the present disclosure described above.

The respective components constituting the molded body preferably satisfy the requirements described in items 1-1 to 1-6 above.

The shape of the molded body is not particularly limited and may be any shape such as a sheet shape, a block shape, a spherical shape, or a three-dimensional shape, for example.

The molded body is used for any application and can be suitably applied to those used in an environment in which dust generation or the like is problematic, more specifically, to a member having a fluid path, a member disposed around such a member, an ink cartridge, various containers, and various fixtures, for example. A molded body produced by using an existing material including cellulose fibers and a resin has had the problem of easily causing dust generation and has had the problem of unsuitable for those used in an environment in which dust generation or the like as described above is problematic. On the other hand, the molded body according to the present disclosure hardly generates dust. Accordingly, the effects provided by the present disclosure are more remarkably exhibited when the molded body according to the present disclosure is applied for application described above.

4 Molded Body Production Method

Next, a molded body production method according to the present disclosure will be described.

In the molded body production method, the molding material of the present disclosure described above is molded while heating same at a temperature at which the resin melts.

Consequently, a molded body production method capable of producing a molded body that includes polyurethane and is excellent in both impact strength and bending strength can be provided.

Compression molding, extrusion molding, and the like may be employed as a molding method, for example. However, injection molding is preferable.

Consequently, even a molded body having a complicated structure, a molded body having a fine structure, and the like can be suitably produced.

The temperature at which the molding material is heated during molding is preferably lower than 200° C., more preferably 120° C. or higher and 190° C. or lower, and still more preferably 150° C. or higher and 180° C. or lower.

Consequently, moldability and productivity of the molded body can be made more excellent, while suitably preventing thermal decomposition of polyurethane. In addition, mechanical strength of a molded body produced can be made more excellent.

Post-treatment such as machine processing like grinding and polishing, coating, and plating may be carried out after the molding described above, for example.

Hereinbefore, preferable embodiments of the present disclosure are described, but the present disclosure is not limited thereto.

EXAMPLES

Next, specific examples of the present disclosure will be described.

5 Preparation of Molding Material

Example 1

First, collected market clothing including cellulose fibers, urethane fibers, acrylic fibers, and polyester fibers was prepared as a fiber source.

This fiber source was shredded, in atmospheric air, using a shredder having a coarsely pulverizing blade into an approximately cube shape with a side length of several millimeters, subsequently blown with an air flow, and defibrinated.

The proportions of the cellulose fibers, the urethane fibers, the acrylic fibers, and the polyester fibers in the obtained defibrinated product was 3.8:0.7:3.1:2.4 in terms of mass ratio.

Amounts of 10.0 parts by mass of the defibrinated product obtained as described above and 90.0 parts by mass of polypropylene (manufactured by Prime Polymer Co., Ltd., H700) as a resin melting at 200° C. or lower were weighed. Thereafter, the weighed defibrinated product and polypropylene were put into a biaxial kneader (manufactured by TECHNOVEL CORPORATION, KZW15TW-45 MG) and kneaded. As kneading conditions, the highest heating temperature was set to 180° C., and the extrusion discharging amount was set to 1 kg/hr. Then, the kneaded product was processed into a strand shape, and a pellet molding material was then obtained using a pelletizer.

The average length of the cellulose fibers was 1.5 mm, the average diameter of the cellulose fibers was 15 μm, the average length of the urethane fibers was 1.5 mm, the average diameter of the urethane fibers was 50 μm, and the number average molecular weight of polyurethane constituting the urethane fibers was 60000 in the molding material. The melting point of the polypropylene (manufactured by Prime Polymer Co., Ltd., H700) was 165° C.

Examples 2 to 6

Pellet molding materials were prepared in the same manner as in Example 1 described above except that the types and use amounts of the raw materials were changed so that the compositions of the molding materials shown in FIGURE were achieved.

Comparative Examples 1 to 7

Pellet molding materials were prepared in the same manner as in Example 1 described above except that the types and use amounts of the raw materials were changed so that the compositions of the molding materials shown in FIGURE were achieved.

6 Production of Molded Bodies

Each of the molding materials in Examples and Comparative Examples was injection-molded using an injection molding machine (manufactured by NISSEI PLASTIC INDUSTRIAL CO., LTD., THX40-5V) to try to produce a molded body for Charpy impact strength evaluation, a molded body for bending strength evaluation, and a molded body for bending elastic modulus evaluation described later. The temperature for heating the molding material during injection molding was set to 180° C. The molded body for Charpy impact strength evaluation was a rectangular plate-shaped molded body having a longer side length of 80 mm±2 mm, a shorter side length of 4.0 mm±0.2 mm, and a thickness of 10.0 mm±0.2 mm, and the molded body for bending strength evaluation and the molded body for bending elastic modulus evaluation were each a rectangular plate-shaped molded body having a longer side length of 80 mm±2 mm, a shorter side length of 10.0 mm±0.2 mm, and a thickness of 4.0 mm±0.2 mm.

7 Evaluation

The molded body of each of Examples and Comparative Examples was subjected to the following evaluations.

7-1 Moldability

The molded body for bending strength evaluation was tried to produced ten times for each of the molding materials in Examples and Comparative Examples as described in item 6 above, and evaluation thereon was made according to the following criteria. Note that a molded body satisfying the conditions that no drooling occurred in the injection molding machine and the molded body was free of burrs, shortshots, voids, sinks, silver streaks, flow marks, warpage, weld lines, cracks, jetting, and burned marks was determined as a non-defective product, and a molded body not satisfying said conditions was determined as a defective product.

A: The number of non-defective products is 10 out of 10.

B: The number of non-defective products is 6 or more and 9 or less out of 10.

C: The number of non-defective products is 1 or more and 5 or less out of 10.

D: The number of non-defective products is 0 out of 10.

7-2 Charpy Impact Strength

Charpy impact strength was measured in accordance with ISO 179 (JIS K7111) using an impact tester IT manufactured by Toyo Seiki Seisaku-sho, Ltd. for each of the molded bodies for Charpy impact strength evaluation of Examples and Comparative Examples produced as described in item 6 above. In Charpy impact strength measurement, the hummer weight was 4 J (WR 2.14 N/m), the raising angle was 150°, the remaining notch width was 8.0 mm±0.2 mm, and the notch angle was 45°.

7-3 Bending Strength

Bending strength was measured in accordance with ISO 178 (JIS K7171) using 68TM-30 manufactured by Instron for each of the molded bodies for bending strength evaluation of Examples and Comparative Examples produced as described in item 6 above. In bending strength measurement, the distance between fulcrums was 64 mm.

7-4 Bending Elastic Modulus

The bending elastic modulus was measured in accordance with ISO 178 (JIS K7171) using 68TM-30 manufactured by Instron for each of the molded bodies for bending elastic modulus evaluation of Examples and Comparative Examples produced as described in item 6 above. In bending elastic modulus measurement, the distance between fulcrums was 64 mm.

These results are summarized and shown in FIGURE together with the composition and the complex viscosity at 180° C. of each of the molding materials obtained in Examples and Comparative Examples.

Note that, in FIGURE, the numerical values with respect to the constituents represent the contents in the molding materials, and the units thereof are mass %. The polypropylene (manufactured by Prime Polymer Co., Ltd., H700, melting point: 165° C.) was denoted as "polypropylene," and the polylactic acid (manufactured by UNITIKA Ltd., TE-2000, melting point: 160° C.) was denoted as "polylactic acid." The complex viscosity shown in FIGURE represents a value of complex viscosity at 180° C. obtained through the following measurement. That is, the complex viscosity is a value obtained by measurement using Pheosol-G3000 (manufactured by UBM) in which a sample with a thickness of 1 mm is interposed in a gap between parallel plates and sandwiched therebetween, and the lower flat plate is angularly vibrated in this state, the measurement conducted under the following conditions: initial temperature: 100° C., temperature increment: 1° C., final temperature: 200° C., temperature increase rate: 5° C./min, strain control: 0.1 deg, frequency: 1 Hz, automatic control: ON, waveform: sine wave, continuous vibration: ON, average number of times: 3, and load control: OFF. The polyurethane was included in each of the molded bodies of Examples in a state of being compatible with the polypropylene or the polylactic acid. In other words, the urethane fibers used as a raw material for the molding materials were compatible with the polypropylene and thus did not maintain the fibrous state in the molded bodies of Examples. Meanwhile, the cellulose fibers, the acrylic fibers, and the polyester fibers used as raw materials for the molding materials maintained the fibrous state in the molded bodies of Examples even after production of the molded bodies.

As is clear from FIGURE, excellent results were obtained from each of Examples. On the other hand, no sufficient result was obtained from each of Comparative Examples.

In addition, molding materials were produced in the same manner as Examples described above except that the average length of the cellulose fibers was changed within the range of 50 μm or more and less than 3 mm, the average diameter of the cellulose fibers was changed within the range of 3 μm or more and less than 100 μm, the average length of the urethane fibers was changed within the range of 50 μm or more and less than 3 mm, the average diameter of the urethane fibers was changed within the range of 3 μm or more and less than 100 μm, and the number average molecular weight of the polyurethane constituting the urethane fibers was changed within the range of 20000 or more and 300000 or less in the molding materials, and the same evaluations as those described above were conducted thereon to obtain results similar to those described above.

What is claimed is:

1. A molding material comprising cellulose fibers, a resin melting at 200° C. or lower, and polyurethane, wherein the molding material has complex viscosity at 180° C. of 3000 Pa·s or more and 147000 Pa·s or less, and the cellulose fibers are at least one selected from the group consisting of cotton, linen, rayon, and cupra.

2. The molding material according to claim 1, wherein the resin is at least one selected from the group consisting of polypropylene and polylactic acid.

3. The molding material according to claim 1, wherein a sum of a content of the resin and a content of the polyurethane is 25.0% by mass or more and 91.0% by mass or less.

4. The molding material according to claim 1, wherein an average length of the cellulose fibers is 50 μm or more and less than 3 mm.

5. The molding material according to claim 1, wherein an average diameter of the cellulose fibers is 3 μm or more and less than 100 μm.

6. A molded body formed from the molding material according to claim 1.

7. A molded body production method, comprising molding the molding material according to claim 1, while heating the molding material at a temperature at which the resin melts.

8. The molded body production method according to claim 7, wherein the temperature for heating the molding material is 120° C. or higher and 190° C. or lower.

9. The molding material according to claim 1, wherein a content of the polyurethane is 0.3% by mass or more and 6.0% by mass or less.

* * * * *